(12) United States Patent
Metternich et al.

(10) Patent No.: US 6,954,633 B1
(45) Date of Patent: Oct. 11, 2005

(54) METHOD FOR CALLING UP USER-SPECIFIED INFORMATION USING A MOBILE TELEPHONE

(75) Inventors: Jorg Metternich, Elze (DE); Gerald Arnold, Spremberg (DE); Michael Ehrmantraut, Lehrte (DE); Stefan Akerblom, Hannover (DE)

(73) Assignee: International Business Machines Corporation, Armonk, NY (US)

( * ) Notice: Subject to any disclaimer, the term of this patent is extended or adjusted under 35 U.S.C. 154(b) by 870 days.

(21) Appl. No.: 09/176,012

(22) Filed: Oct. 20, 1998

(30) Foreign Application Priority Data

Oct. 28, 1997 (DE) ............................. 197 47 438

(51) Int. Cl.⁷ ............................................. H04Q 7/20
(52) U.S. Cl. ...................... 455/414; 455/466; 455/557
(58) Field of Search ................................ 455/414, 466, 455/564, 566, 563; 379/355

(56) References Cited

U.S. PATENT DOCUMENTS

| | | | | |
|---|---|---|---|---|
| 5,875,405 A | * | 2/1999 | Honda | 455/564 |
| 5,920,821 A | * | 7/1999 | Seaholtz et al. | 455/466 |
| 5,943,611 A | * | 8/1999 | Molne | 455/89 |
| 5,943,614 A | * | 8/1999 | Obayashi et al. | 455/411 |
| 6,112,078 A | * | 8/2000 | Sormunen et al. | 455/411 |
| 6,112,084 A | * | 8/2000 | Sicher et al. | 455/426 |
| 6,115,754 A | * | 9/2000 | Landgren | 709/249 |
| 6,208,877 B1 | * | 3/2001 | Henry, Jr. | 455/566 |

FOREIGN PATENT DOCUMENTS

| | | | |
|---|---|---|---|
| EP | 0 491 493 A | 6/1992 | H04M 3/42 |
| EP | 0 689 368 A | 12/1995 | H04Q 7/22 |
| WO | WO 97/23988 | 7/1997 | H04M 3/42 |

* cited by examiner

*Primary Examiner*—Temica Beamer
(74) *Attorney, Agent, or Firm*—Daniel E. McConnell

(57) ABSTRACT

The SMS messages of a mobile telephone are used to call up information which is unconnected in time and location with the mobile telephone. To specify the desired information and to define the brief commands the user of the mobile telephone uses data-processing equipment with data lines to the information provider, e.g. Internet connection, by means of which he can deposit query profiles with the information provider. In addition, the query profiles can be produced using a speech computer. The user can call up the dormant query profiles by means of simple brief commands and obtain the required information. The desired information will be reproduced either visually or acoustically via the mobile telephone. The advantages of both communication media are therefore combined with one another in an ideal manner, where the hardware of the mobile telephone and/or its method of operation remain unchanged.

19 Claims, 3 Drawing Sheets

METHOD FOR CALLING UP USER-SPECIFIED INFORMATION USING A MOBILE TELEPHONE

TECHNICAL FIELD

The present invention describes a process for calling up user-specified information, set up with an information provider, and which can be called up quickly and simply using Short Message Service (SMS) messages of a mobile telephone.

BACKGROUND

At the present time, there are three different methods for calling up information over a mobile phone by SMS:

(1) Entry of precise parameters. With this method, the user must specify exactly the information which he has requested and provide authorization (e.g. with a PIN). Thus, if he wishes, for example, to query his account status, he must enter his account number, the data required (namely, the status of his account) and his PIN. In the case of complex or many parameters, this message can be very long; i.e., the number of keys to be pressed is very large.

(2) Entry of brief commands. With this method, the user must know a set of possible abbreviated commands. These brief commands are established by the information provider (e.g., bank) and are the same for all users. However, only the command itself is abbreviated. Account number and PIN still need to be entered.

(3) Individual brief commands. This method offers the user a very convenient way of calling up their information. For this, however, an individual list of commands must be made available to him by the information provider. In addition, the user must supply his mobile phone number to the information provider. This method can only be handled with difficulty on the part of the information provider since, with a large number of clients, a very large quantity of data has to be produced and managed. In addition, changes by the client (type of information, mobile phone number, etc.) to data that require updating can be expensive to implement.

Common to these above-mentioned methods is the fact that the user formulates an inquiry with the aid of an SMS message. This message is evaluated by the information provider and the information requested is sent to the mobile phone by means of one or more SMS messages. It is a disadvantage of this process that up to 4 keys must be pressed to allow a single letter to be printed.

European Offenlegungsschrift EP 0731 590 A2 describes a mobile telephone with a key pad with selection and radio keys and a display field, with further keys (soft keys) and optionally integrated transmit/receive devices (handheld) in the operating part.

One disadvantage of this proposed solution is that an additional device is required on the mobile phone for processing and sending messages in the sense that received messages to be confirmed with "Yes" are sent back to the sender by operating a soft-key button and a yes input with an additional confirmation. This invention is limited exclusively to YES/NO answers. It does not simplify the sending of complex messages. In addition, this method requires modification of the mobile phone.

The method described has either the disadvantage that it requires from the client very detailed and, hence, long entries or that it requires the client to know what can sometimes be a large set of short commands, which the information provider is able to manage only at very considerable expense.

The task of the present invention is to make available a new method for calling up user-specified information over a mobile phone which enables complex information to be called up by simple messages over the mobile phone without the necessity that the mobile phone itself be modified, without the need for the user to know any commands predetermined by the information provider and without requiring any additional management expenditure on the part of the information provider.

SUMMARY OF THE INVENTION

It is an object of the present invention to provide access to information that is complex to specify from a mobile phone with a simple message, without modification of a mobile phone.

It is a further object of the present invention to provide access to information that is complex to specify without the user knowing any commands predetermined by the information provider from a mobile phone with a simple message without the user knowing any commands predetermined by the information provider.

In accordance with a preferred embodiment of the present invention, the SMS messages of a mobile telephone are used to call up information which is unconnected in time and location with the mobile telephone. To specify the desired information and to define the brief commands the user of the mobile telephone uses data-processing equipment with data lines to the information provider; e.g., Internet connection, by means of which he can deposit query profiles with the information provider. In addition, the query profiles can be produced using a speech computer. The user can call up the dormant query profiles by means of simple brief commands and obtain the required information. The desired information will be reproduced either visually or acoustically via the mobile telephone. The advantages of both communication media are therefore combined with one another in an ideal manner, where the hardware of the mobile telephone and/or its method of operation remain unchanged.

One advantage of the present invention resides in the combination of two different communication media. The SMS messages are used in order to call up information at any time from any place using a mobile phone. To specify the desired information and to define the short command, the user of the mobile phone employs a data-processing device with a data line (e.g., Internet connection), by means of which an inquiry profile can be laid down with the information provider. In addition, the inquiry profile can be produced by means of a speech computer. The user can call up the recorded inquiry profile by means of a simple short command and obtain the desired information. The desired information is reproduced, either audibly or visually, through the mobile phone. The characteristics of both media are, therefore, coupled with one another in an ideal manner, where the hardware of the mobile phone and/or its operation remain unaltered.

BRIEF DESCRIPTION OF THE DRAWINGS

The foregoing and other objects, aspects and advantages of the present invention will be better understood from the following detailed description with reference to the drawings in which.

DETAILED DESCRIPTION OF THE PREFERRED EMBODIMENT

Figure 1:
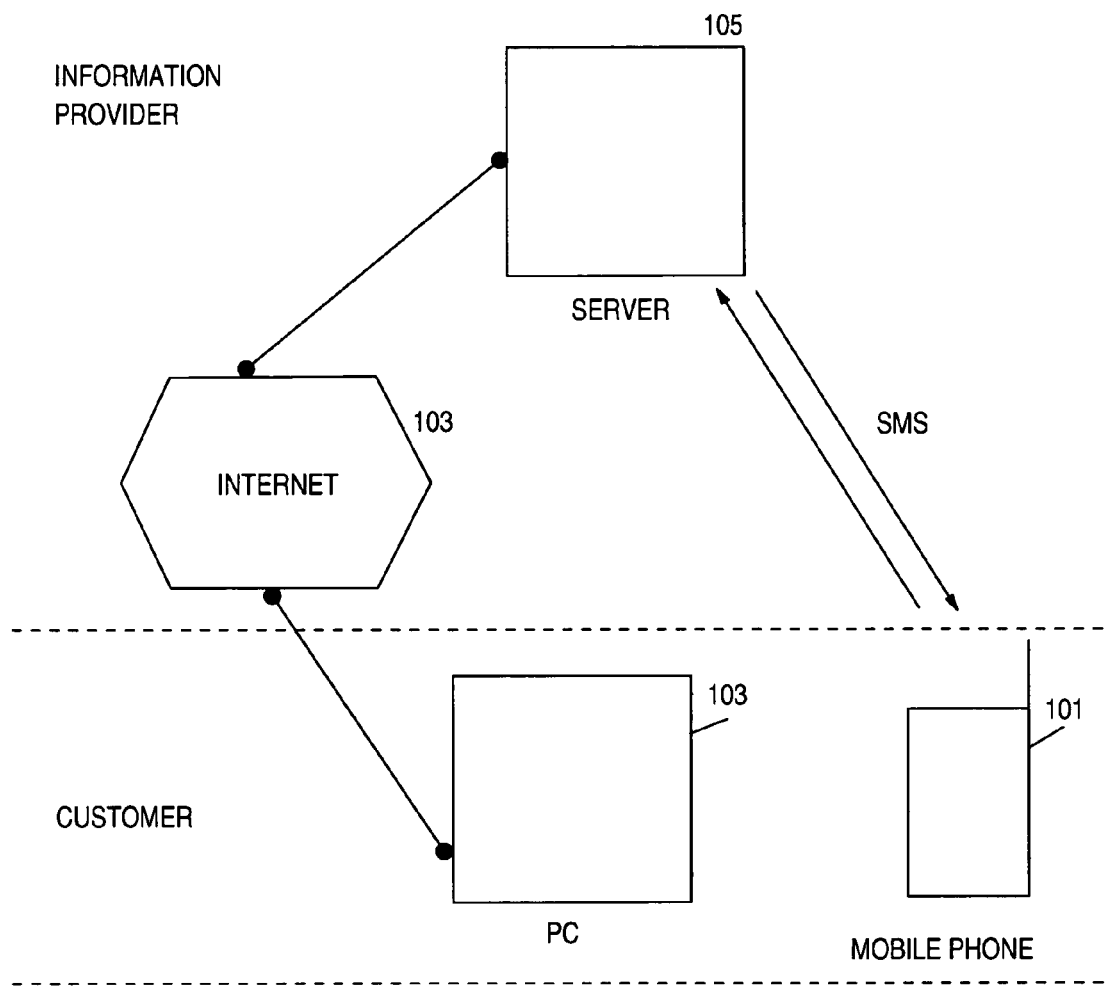
FIG. 1 shows the implementation of the present invention using the Internet.

The architecture in accordance with the present invention in FIG. 1 consists of the user's mobile phone 101, the user's data-processing device (PC) 103 with network connection, e.g. Internet connection and the information provider's data-processing device (Server) 105, which is connected with the user's data-processing equipment (Internet) 103.

The user of the mobile phone effects a connection to the information provider's computer through a data-processing device and produces an inquiry profile, which contains the corresponding short command for any information which may be queried, so that he can conveniently obtain this information in the future through the mobile phone. The technical implementation whereby the user transfers the query profile to the information provider can take a number of forms. A preferred form of implementation consists in the use of the Internet and/or an Intranet and the methods and techniques established thereon for user interaction, such as, for example, HTML, CGI, JAVA, ActiveX, etc. These techniques enable the producer/user to enter the inquiry profile with the inquiry being made and its short command in a simple fashion and sent to the information provider. These inquiry profiles are managed and/or stored by the information provider. If, at some future time, the user sends one of these short commands to the information provider over his mobile phone by SMS, the latter checks the user's telephone number and the short command sent with the inquiry profile previously produced by the user and sent to the information provider. If they agree, the desired information is sent to the user of the mobile phone by SMS.

Another embodiment of the present invention can also comprise using a "Call Center" instead of the Internet. In this case, the user is accompanied through the configuration menu either by a voice computer or even by a person. The inquiry profile is entered by the user either through the telephone keypad or orally.

A further embodiment is the direct dialing by the user of the mobile phone with his modem through the telephone network to the information provider. Since this is only using an alternative means of transmission to the Internet, the comments made in respect to the Internet apply.

In a final embodiment, the user of the mobile phone communicates the inquiry profile to the information provider himself (telephone/fax/letter, etc.) and the information provider inputs and stores this information for later use.

Figure 2:
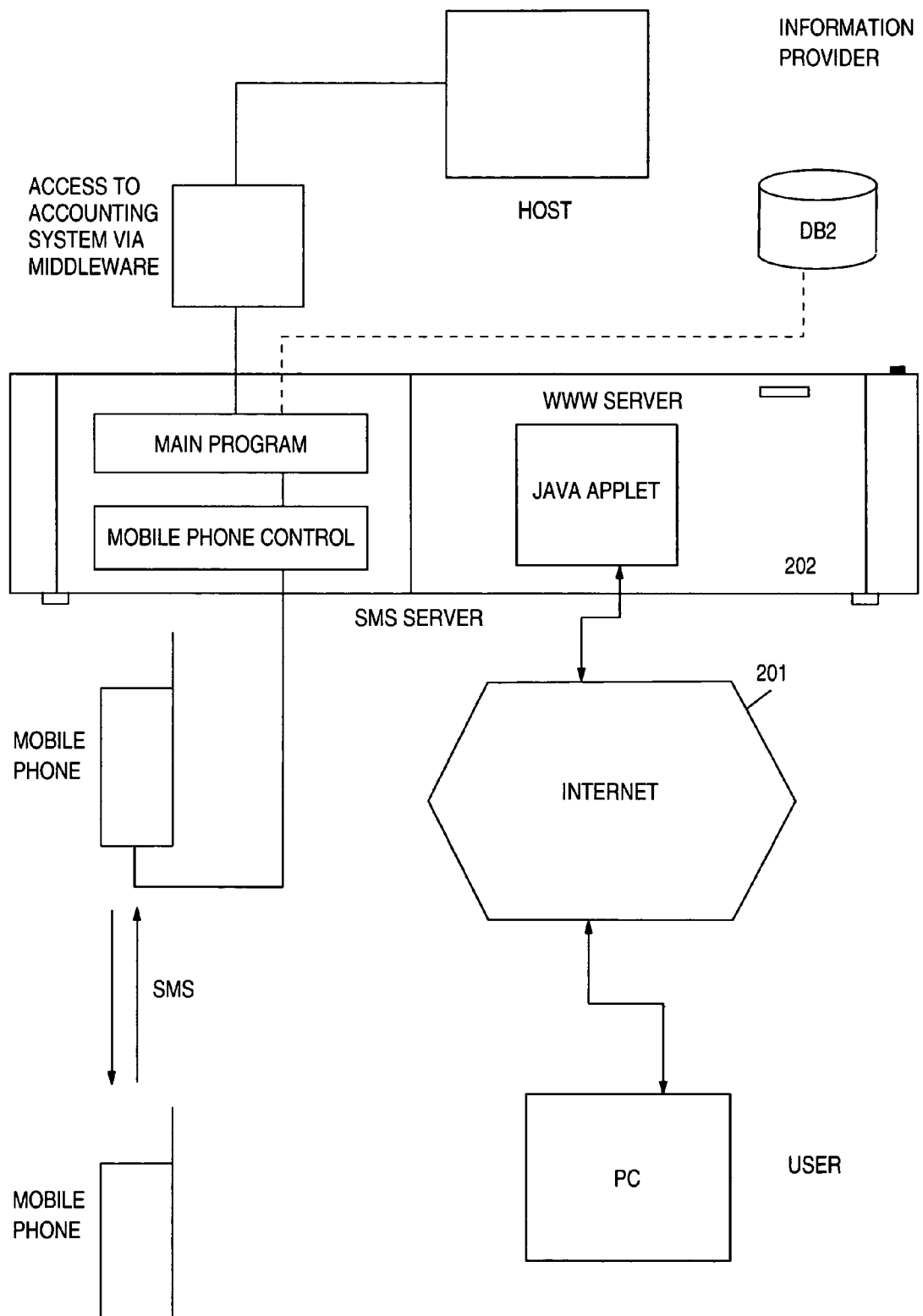
FIG. 2 shows the architecture in accordance with a financial institution.

FIG. 2 describes the implementation of the present invention using a bank architecture. The bank architecture consists, in essence, of an SMS server 202, connected with one or more systems which prepare the required information. In addition, the SMS server is connected to the Internet. The SMS server has access to a WWW server program through which the customer can draw the JAVA applets and with the aid of which he can define the information to be asked for and its short command (i.e., the inquiry profile). In addition, the SMS server also has access to an SMS program, which manages this information, compares the messages entered with the short commands entered and, if they agree, gathers the desired information with the aid of the attached systems.

The sending of this collected information is effected by means of another program which is installed on the SMS server. The separation of the functions over several programs is of a logical nature and is not a technical requirement of the present invention.

The information can be sent over one of the information provider's mobile phones or the information is sent via a data link from the information provider to the mobile phone network operator who sends the information over the telephone network to the mobile phone user.

The information is usually shown on the display of the mobile phone. However, it is also possible to prepare the information acoustically and send it to the mobile phone user.

Figure 3:
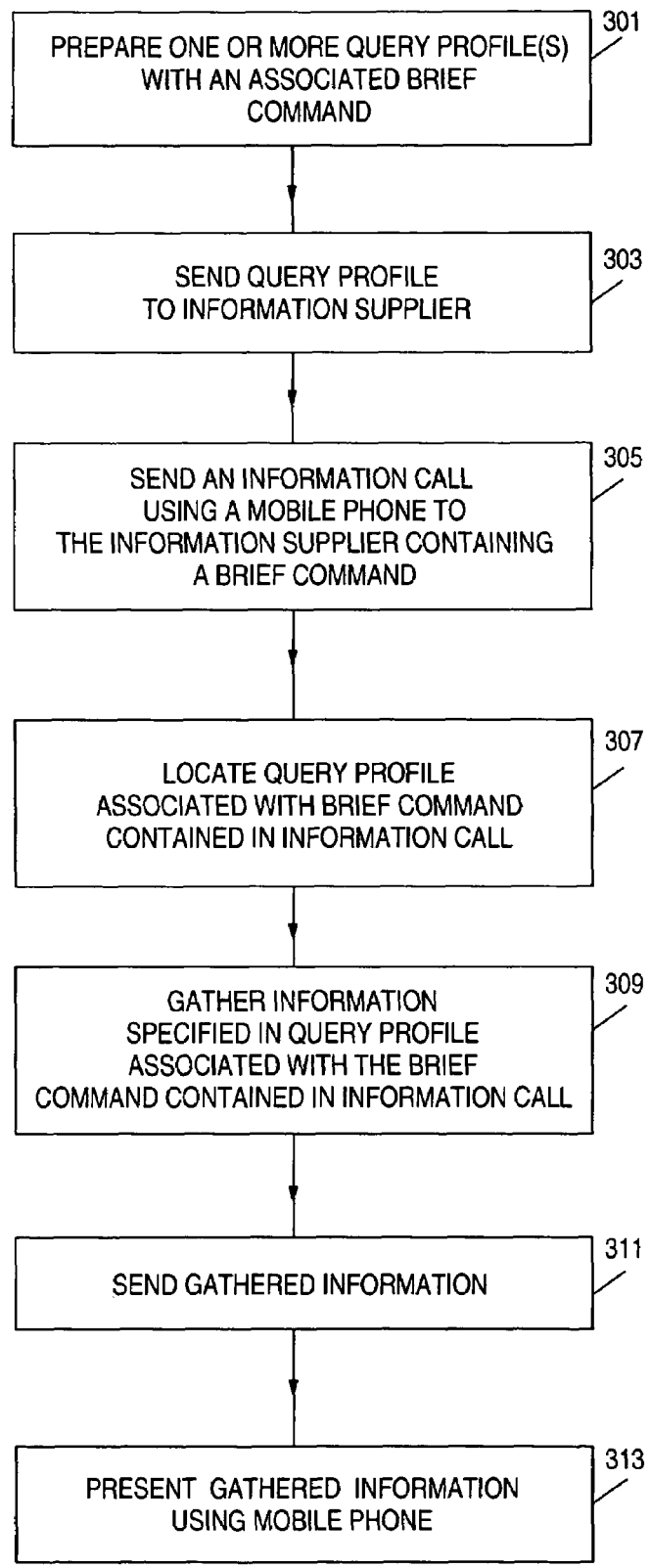
FIG. 3 shows the method in accordance with the present invention.

FIG. 3 is a method of calling up user specified information using a mobile phone.

In step 301, one or more query profiles are prepared, each query profile being associated with a brief command. In step 303, the query profile is sent to the information supplier. The information may be sent via the Internet or a direct connection to the information supplier processing center or the call center. In step 305, an information call is placed using a mobile phone to the information supplier which contains a brief command. In step 307, the information call contained in the brief command is parsed and the brief command is used to locate the query profile or profiles which are associated with the brief command contained in the information call. In step 309, the query profile is used to gather information specified in the query profile associated with the brief command contained in the information call. In step 311, the gathered information is sent back to the user via the mobile phone. In step 313, the gathered information is presented to the user using the mobile phone. This may entail providing the user with vocal messages, presenting information on a display of mobile phones, or a combination of both.

In the banking field, the method in accordance with the invention can, for example, be employed for the following inquiries:

Account Balance Inquiries:

Here, the user can define short commands through the Internet by the method shown in FIG. 1; e.g., "KS1 for account balance of account 1=account No. xy". In addition, he gives the number of the mobile phone from which the inquiry may only be made.

Share Price, Deposit Value, Deposit Yield:

Here, the customer can, for example, define short commands via applets which he downloads to his system via the Internet; e.g., "AKI for current market price of the IBM shares". In addition, he provides the number of the mobile phone from which the inquiry can only be made.

To provide security, a PIN and/or a telephone number can be sent to the information provider together with the call for information. The PIN makes sure that the specified information can be called for only by the authorized user. The inclusion of the telephone number ensures that the inquiry profile set up by the information provider can only be requested from the authorized telephone.

The present invention can be used in almost all areas in which information providers have stored information on persons, things or special relationships, which may be of interest to the user of a mobile phone; e.g., insurance business, traffic information, etc.

The SMS messages are used in order to call up information at any place and at any time using a mobile phone. To specify the desired information and to define the short commands, the user of the mobile phone employs a data processing device with a data link; e.g., Internet connection, by means of which inquiry profiles can be deposited with the information provider. In addition, the inquiry profiles can also be recorded via a voice computer. The user can call up or have executed the stored inquiry profile by means of simple short commands and obtain the desired information. The desired information is provided either audibly or visually via the mobile phone. The characteristics of the two media are thus coupled in an ideal manner, where the mobile phone hardware and/or its method of operation remain unaltered.

While the invention has been described in detail herein in accordance with certain preferred embodiments thereof, modifications and changes therein may be effected by those skilled in the art. Accordingly, it is intended by the appended claims to cover all such modifications and changes as fall within true spirit and scope of the invention.

We claim:

1. A method for defining and later retrieving user-specified information by means of a mobile telephone, comprising the following steps:
   a) using a user data processing system to prepare at least one query profile where each query profile has at least one information requirement and an associated brief command and where each brief command can be specified using the keypad of a mobile telephone;
   b) sending the query profile using the user data-processing system to an information supplier;
   c) sending an information call using a mobile telephone to the information supplier containing at least one of the brief commands;
   d) comparing the brief command sent in accordance with step c) with the brief commands of the query profiles prepared and sent in accordance with steps a and b);
   e) putting together the information of the information requirements contained in the associated query profile in the event of agreement in accordance with step d);
   f) sending the collected information to the mobile telephone; and
   g) presenting the information to a user of the mobile telephone by way of the mobile telephone.

2. The method in accordance with claim 1 characterized in that step b) takes place via a data link between the user data-processing system and an information supplier data-processing system.

3. The method in accordance with claim 1 characterized in that the query profile is produced by a speech computer.

4. The method in accordance with claim 1 characterized in that the information call is sent with a PIN, where the PIN establishes entitlement to call up the specified information.

5. The method in accordance with claim 1 characterized in that the information call is sent with a telephone number of the caller, where the telephone number establishes entitlement to call for the information.

6. The method in accordance with claim 2 characterized in that the data link is effected through a modem to the information supplier data-processing system.

7. The method in accordance with claim 2 characterized in that the data link is effected through the Internet to the information supplier data processing system.

8. The method in accordance with claim 1, comprising the further step:
   downloading JAVA applets, stored on a server of the information supplier through the Internet to the user data processing system; and
   preparing the query profile in accordance with step a) by means of the JAVA applets.

9. The method in accordance with claim 1 characterized in that step c) is effected through a SMS of the mobile telephone.

10. The method in accordance with claim 1 characterized in that steps d) through f) are each effected through one of the information supplier's programs.

11. The method in accordance with claim 1 characterized in that sending, in accordance with step f), is effected via another mobile telephone.

12. The method in accordance with claim 1 characterized in that sending in accordance with step f) is effected first via a data link to a mobile radio network operator and then via a telephone network to the mobile telephone.

13. The method in accordance with claim 1 characterized in that the information, in accordance with step 9), is presented visually or acoustically.

14. A method for calling up information via a mobile telephone where a query profile is prepared using a user data-processing system and deposited with an information provider, where the query profile specifies at least one information requirement and with which query profile a brief command is associated for its identification, comprising the following steps:
   a) sending a call for information by means of the mobile telephone to the information provider containing at least the brief command;
   b) comparing the sent brief command with the brief command of the query profile;
   c) putting together the desired information of the at least one information requirement of the query profile in the event of agreement in accordance with step b);
   d) sending the collected information to the mobile telephone; and
   e) presenting the information to a user of the mobile telephone via the mobile telephone.

15. The method in accordance with claim 14 characterized in that step a) is effected via SMS of the mobile telephone.

16. The method in accordance with claim 14 characterized in that steps b) through d) are effected through a program of the information provider.

17. The method in accordance with claim 14 characterized in that the transmission in accordance with step d) is effected via another mobile telephone.

18. The method in accordance with claim 14 characterized in that the transmission in accordance with step d) is effected first via a data link to a mobile radio network operator and then via a telephone network to the mobile telephone.

19. The method in accordance with claim 14 characterized in that the information in accordance with step e) is presented either visually or acoustically.

* * * * *